UNITED STATES PATENT OFFICE.

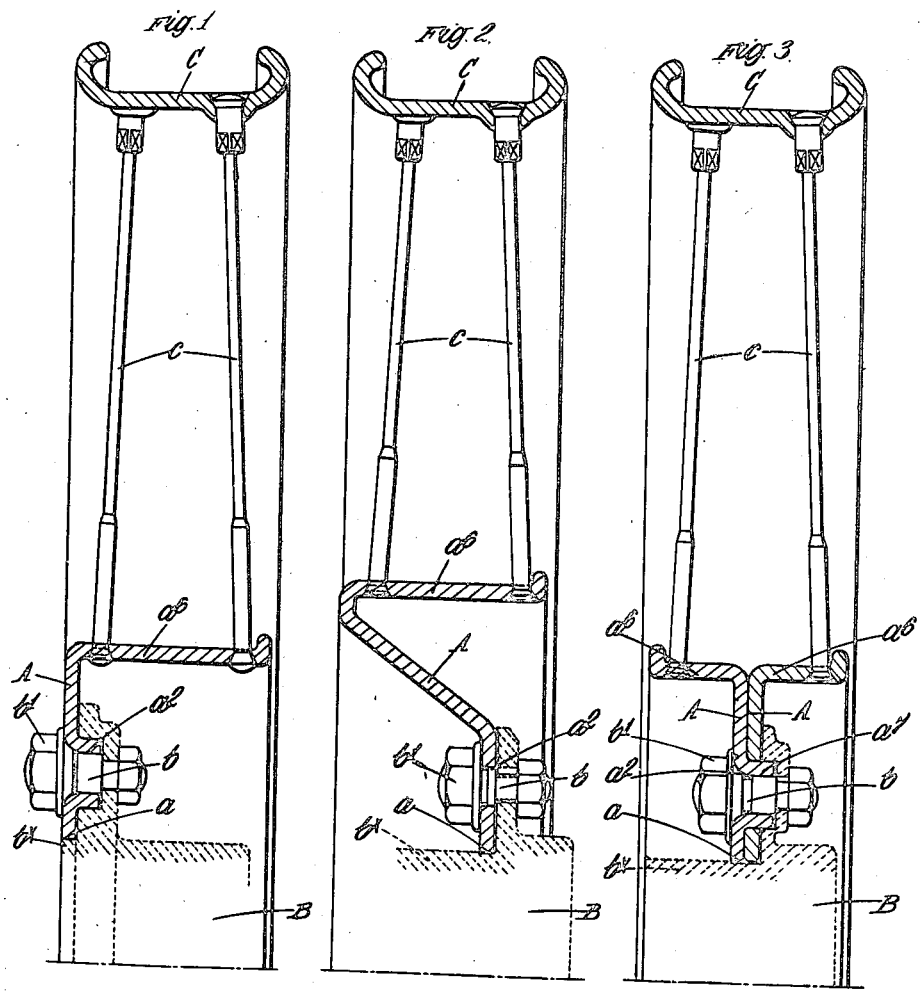

WALLACE HENRY PAULL, OF BIRMINGHAM, ENGLAND, ASSIGNOR TO THE DUNLOP RUBBER COMPANY, LIMITED, OF REGENT'S PARK, LONDON, ENGLAND, A BRITISH COMPANY.

DETACHABLE WIRE-SPOKED WHEEL.

1,410,501.     Specification of Letters Patent.    Patented Mar. 21, 1922.

Application filed January 3, 1921. Serial No. 434,666.

*To all whom it may concern:*

Be it known that I, WALLACE HENRY PAULL, a subject of the King of Great Britain, residing at Aston Cross, Birmingham, in the county of Warwick, England, have invented certain new and useful Improvements in or Relating to Detachable Wire-Spoked Wheels, of which the following is a specification.

This invention relates to detachable wire spoked wheels the central portion or boss of the wheel is pressed from sheet metal into dished form i. e. in the nature of a peripherally flanged disc having in the body portion thereof a central hole for fitting onto the cylindrical part of the hub and an annular series of holes for the retaining bolts, the annular peripheral flange formed by the dishing being connected to the wheel rim by the wire spokes. The part of the body portion of the dished disc in which the holes for the retaining bolts are formed is at right angles to the wheel axis and may occupy any desired lateral position relatively to the ends of the flanged periphery.

In order that the said invention may be clearly understood and readily carried into effect the same will now be described more fully with reference to the accompanying drawings, in which:—

Figure 1 is a cross section of the upper half of one form of my improved wheel.

Figures 2 and 3 are cross sections showing other modifications of my improved wheel.

Like letters of reference indicate similar parts in all the figures.

A is the dished disc forming the central portion of the wheel and $a$ is the central hole which fits onto the cylindrical part $b^x$ of the hub B shown in dotted lines. The said dished disc has an annular series of holes $a^2$ for the reception of the retaining bolts or studs $b$, whose outer threaded ends are provided with nuts $b'$ for retaining the wheel in place on the hub as is well understood. $a^6$ is the annular peripheral flange of the dished disc which is connected to the wheel rim C by the wire spokes $c$ $c$ secured to said rim and flange in any appropriate manner. The central portion of the dished disc A in which the holes for the retaining bolts are formed is at right angles to the axis of the wheel as shown. In Figure 1 the said portion is situated at one end of the flange $a^6$ and in Figures 2 and 3 said portion lies in a plane situated at or near that which passes through the middle of the rim C, and in Figure 2 said portion is joined to the flange $a^6$ by a conical part, the said portion may, however, as above stated occupy any desired lateral position relatively to the ends of the flanged periphery. In Figure 3 the central portion consists of two flanged discs arranged back to back with their flanges $a^6$, $a^6$ extending outwardly, and the bolt holes in one of the discs are flanged as shown at $a^7$ and fit into the bolt holes in the other disc which are formed plain. In Figure 1 the said bolt holes are also shown flanged.

What I claim and desire to secure by Letters Patent of the United States is:—

1. A detachable wire spoked wheel having a dished sheet metal boss the flanged periphery of which is suitably formed for the reception of the inner ends of the wire spokes and the body portion has a central hole fitting the cylindrical part of the hub and also has a circular series of holes surrounding said central hole for the reception of retaining bolts.

2. A detachable wire spoked wheel having a dished sheet metal boss the flanged periphery of which is suitably formed for the reception of the inner ends of the wire spokes and the body portion has a central hole fitting the cylindrical part of the hub and also with a circular series of holes surrounding said central hole for the reception of retaining bolts the part of said body portion in which the holes are made being at right angles to the wheel axle.

3. A detachable wire spoked wheel having a dished sheet metal boss the flanged periphery of which is suitably formed for the reception of the inner ends of the wire spokes and the body portion has a central hole fitting the cylindrical part of the hub and also has a circular series of holes surrounding said central hole for the reception of retaining bolts the part of said body portion in which the holes are made being at right angles to the wheel axis and lying in a plane passing approximately through the middle of the wheel rim.

WALLACE HENRY PAULL.